United States Patent [19]

Barry et al.

[11] 4,252,734
[45] Feb. 24, 1981

[54] SUBSTITUTED AMMONIUM COMPOUNDS FOR USE IN ELECTRODEPOSITION

[75] Inventors: Richard Barry, Minneapolis; Don E. Floyd, Robbinsdale, both of Minn.

[73] Assignee: Henkel Corporation, Minneapolis, Minn.

[21] Appl. No.: 61,218

[22] Filed: Jul. 27, 1979

[51] Int. Cl.³ .................... C09F 5/00; C11C 3/00; C08L 91/00
[52] U.S. Cl. .................... 260/404.5; 260/18 N; 260/407; 204/159.16; 204/159.22; 204/161
[58] Field of Search ............ 260/404.5 R, 404.5 PA, 260/404.5 ED, 18 N; 204/159.16, 159.22, 161

[56] References Cited

U.S. PATENT DOCUMENTS

| | | | |
|---|---|---|---|
| 3,127,365 | 3/1964 | Floyd | 260/404.5 |
| 3,558,387 | 1/1971 | Bassemir et al. | 260/23 P |
| 3,816,366 | 6/1974 | Landise | 260/404.5 |
| 3,900,437 | 8/1975 | Preston | 260/18 N |
| 4,127,460 | 11/1978 | Gaske et al. | 204/159.16 |
| 4,166,017 | 8/1979 | McGinniss | 204/159.16 |
| 4,180,487 | 12/1979 | Floyd | 260/18 N |

Primary Examiner—John F. Niebling
Attorney, Agent, or Firm—Forrest L. Collins; Patrick J. Span

[57] ABSTRACT

The present invention deals with unique substituted ammonium compounds for use in cationic electrodeposition processes.

9 Claims, No Drawings

SUBSTITUTED AMMONIUM COMPOUNDS FOR USE IN ELECTRODEPOSITION

BACKGROUND OF THE INVENTION

1. Field of the Invention

The present invention relates to electrodeposition such as is practiced in the automotive industry.

2. Description of the Art Practices

Electrodeposition is defined as the process of depositing a film forming material through the use of electrical potential. There are two forms of electrodeposition. The first and most widely known and used form is that of anodic deposition wherein the negatively charged film forming material is attracted to the anode where the negative charge is removed and the material is plated out. The second form of electrodeposition is known as cationic deposition wherein the film forming material contains a positively charged group which is attracted to the cathode. At the cathode the positive charge of the film forming material is neutralized by the electrons flowing through the cathode and the film is deposited thereon. In either cathodic or anodic electrodeposition of course, the substrate to which the film is applied was the electrode involved in the reaction. A second cure, usually thermal, is employed to fix the film forming material onto the desired surface.

Considerable discussion of the subject of both cationic and anodic electrodeposition is found in THE CHEMISTRY OF BINDERS FOR ELECTRODEPOSITION found in PROGRESS IN ORGANIC COATINGS, 7 (1979) Pages 1–77. Specific systems which discuss cationic electrodeposition are found in U.S. Pat. No. 3,922,253 issued Nov. 25, 1975 to Jerabek et al.

It is known in the art that acrylic containing compounds may be utilized to finally cure a film-forming substance into a resin through the use of radiation or photoinitiation techniques. It is also known that acrylic compounds may be used as prepolymers in the film-forming system by reacting the acrylic or methacrylic group with a second reactive compound such as an amine and thereafter utilizing the additional functionality on the amine compound to finally cure the resin system.

Among the art which describes the various techniques and uses of acrylic or methacrylic compounds in resin systems are U.S. Pat. No. 3,127,365 issued Mar. 31, 1964 to Floyd wherein amino-polyamide compounds which have been modified with acrylic compounds are discussed. In U.S. Pat. No. 3,558,387 issued Jan. 26, 1971 to Bassemir et al. certain photopolymerizable compositions and specific photoinitiators are discussed. U.S. Pat. No. 3,637,618 issued Jan. 25, 1972 to May sets forth curable polyester compositions containing acrylic functionalities in the backbone of the polyester.

Laudise in U.S. Pat. No. 3,816,366 issued June 11, 1974 describes adducts of active acrylic compounds and an aminoamide which is suitable as a curing agent for epoxies in aqueous systems. U.S. Pat. No. 3,844,916 issued Oct. 29, 1974 to Gaske describes radiation curable Michael addition reaction products obtained by reacting an amine with a stoichiometric excess of a polyacrylate. Borden et al. in U.S. Pat. No. 3,876,518 issued Apr. 8, 1975 describes the reaction products of organic amines, acrylic substances and epoxidized soybean oil. The compositions of Borden et al. are stated to be useful either alone or in conjunction with a photosensitizer for use as inks or coatings. Other disclosures of compounds containing polyacrylate esters are found in U.S. Pat. No. 4,051,195 to McWhorter issued Sept. 27, 1977 wherein the reaction products of epoxide resin and a polyacrylate or polymethacrylate ester are described.

U.S. Pat. No. 3,446,723 to Pohlemann et al. issued May 27, 1969 describes cationic coating compositions containing acrylic or methacrylic acid aminoalkylamide compounds. Dowbenko in U.S. Pat. No. 3,679,564 issued July 25, 1972 describes imine-modified carboxylic acid containing acrylic resins as being useful in cationic deposition. U.S. Pat. No. 3,853,803 issued to Anderson et al. on Dec. 10, 1974 describes cationic compounds useful for electrodeposition containing carboxylated acrylic copolymers. Throughout this patent percentages and ratios are by weight and temperatures in Celsius unless otherwise indicated.

SUMMARY OF THE INVENTION

The present invention describes a material useful in preparing components for cationic electrodeposition which is a vinyl functional compound comprising the reaction product of:

(a) an amido amine which is the product of reacting a fatty acid having from about 8 to about 22 carbon atoms with an amine containing from about 2 to about 10 carbon atoms and which contains at least 3 available amine hydrogens wherein at least 1 secondary amine hydrogen remains after the amide formation;

(b) a sufficient amount of a member selected from the group consisting of acrylic acid esters, methacrylic acid esters, ethylene oxide, propylene oxide and mixtures thereof to react with any remaining primary amine hydrogens and;

(c) a vinylic material having at least 2 vinyl reactive groups in an amount sufficient to substantially react with the remaining secondary amine hydrogens, to give the vinyl functional compound.

DETAILED DESCRIPTION OF THE INVENTION

The present invention as previously stated relates to the use of cationic resins which are deposited through electrodeposition onto a work piece which functions as the cathode in an electroplating bath. Following the electrodeposition the film formed from the vinyl functional reaction product is then cured through the vinyl linkage to give a highly cross-linked strong, flexible, water resistant coating.

The first component described in the present invention is that of the fatty acid which may be either a saturated or unsaturated fatty acid. It is preferred for terms of water solubility that the fatty acid be an unsaturated material. Generally the fatty acid contains from 8 to 20 carbon atoms preferably from 12 to 18 carbon atoms and is also preferably unsaturated. More specifically oleic acid is a highly preferred starting material.

The oleic acid is reacted with an amine containing from about 2 to 10 carbon atoms to form the amido amine as described in (a) of the Summary. The amine must contain at least 3 available amine hydrocarbons wherein at least 1 secondary amine hydrogen remains after the amido amine formation. That is, the fatty acid component is always designated as being used in one equivalent amounts compared to the number of amine hydrogens on the amine. Therefore, substantially only one amine linkage is present in the compound resulting from the reaction of the fatty acid with the amine.

The condensation of the amine and the fatty acid is conducted in conventional fashion and no particular description will be given of this step. It is essential that at least one secondary amine hydrogen remains following the amido amide formation so that the later described step of reacting the amido amide with the vinylic material takes place through a secondary amine thereby giving the highly desired tertiary amine structure which has been found necessary to effectuate the electroplating in the present invention. As previously described, suitable amines for use in the present invention include both aliphatic and aromatic amines preferably those amines having from 2 to 6 carbon atoms and in particular materials such as triethylene tetramine and N-hydroxyethyl-ethylenediamine and mixtures thereof.

The present invention also contemplates utilizing a sufficient amount of a member selected from the group consisting of ethylene oxide, propylene oxide, and the esters of acrylic and methacrylic acid and mixtures thereof specifically the $C_1$-$C_4$ esters particularly methyl or ethyl to remove any primary amine functionality not previously taken up by the fatty acid in the amido amine formation. It has been found necessary to eliminate all of the primary amine hydrogens in the amido amine for a two fold purpose. First, the primary amine hydrogens have been found particularly unstable if not chemically reacted and thus chalking can result if the primary amine structure is not removed. Secondly, the reaction of the primary amine with multifunctional acrylate esters can lead to gelled products. However, when any primary amine structure remains on the amido amine the reaction with the vinylic material will also proceed with the primary amine leaving the secondary amine structure unreacted. The amount of component (b) as described above is simply that amount necessary to remove any primary amine as shown through standard analytical tests to remain in the amido amine.

The last component utilized to form the vinyl functional compound is a material having at least two vinyl functional groups in an amount sufficient to react with the secondary amine hydrogen in the amido amine to give the vinyl functional compound. Component (c) is designated as the vinylic material. It is, of course, also necessary that at least one of the vinyl functional groups on the vinylic material remain intact for the later cure of the composition through radiation, photoinitiation, or free radical generation. Thus for each secondary amine hydrogen present on the amido amine at least one mole of a difunctional (or higher) vinylic material will be required. That is, as the secondary amine takes up one vinyl group in becoming a tertiary amine a second vinyl group must be present on the vinylic material to allow curing. Preferably the vinylic material is at least trifunctional.

The vinylic material is a multi-functional ester of a polyol having two or more hydroxyl groups and acrylic acid, methacrylic acid, or other alpha, beta-unsaturated carboxylic acid. Suitable materials used as the vinylic material include trimethylol propane triacrylate, trimethylol propane trimethacrylate, hexane diol diacrylate, pentaerythritol triacrylate, pentaerythritol trimethacrylate, pentaerythritol tetra-acrylate and pentaerythritol tetra-methacrylate.

Following the preparation of the vinyl functional compound it is next necessary to convert that material to the corresponding substituted ammonium salt. This is done through reacting the vinyl functional compound with a material such as lactic or acetic acid or materials which will generate these substances in solution such as their anhydrides or their salts to liberate the free anion. The anion then reacts with the vinyl functional compound to give the corresponding ammonium salt which will preferably be a divalent compound with respect to the ammonium groups. The reason divalent compounds are preferred is that it has been found that the charge transfer migration is much more rapid when a divalent cation is employed than a monovalent cation of substantially the same size. That is, the acid generating material utilized to form the cation does not make up a significant portion of the molecule in relation to its total weight, and all tertiary amines on the vinyl functional compound should be utilized to promote rapid deposition on the piece.

The acid or acid anhydride used for the neutralization (of the ammonium salt) reaction is reacted with the vinyl functional compound at a pH of from about 5 to about 8, preferably from about 6 to about 7. The reaction is conducted with an excess of the acid or acid anhydride to ensure that the neutralization reaction proceeds although the exact stoichiometric amount required might be employed.

After the substituted ammonium compound has been formed it will be used in a 7–25%, preferably about 10 to 19% by weight in an aqueous solution in a bath in which the piece to be coated functions as a cathode and through which a current is applied per the discussion given in the Pohlemann et al patent herein incorporated by reference. For the purposes of exemplification only, a Ransburg Model Number 600AA electrodeposition apparatus is employed. This particular apparatus has been converted from anodic deposition to cathodic deposition through reversing the polarity of the electrodes.

The piece onto which the substituted ammonium salt is plated is usually steel although any conductive material may be used. When the electrodeposition bath has been prepared with the electrode and the substituted ammonium salt, a current of about 25 to 100 volts DC at an amperage of about 1 to 8 amps is impressed upon the system to obtain the cathodic deposition on the piece. The coating is generally observed to be complete in a period of about 0.5 to 2 minutes although the reaction may be allowed to proceed for longer times if required. Following the electrodeposition, the piece onto which the film is deposited is washed in running water and thereafter finally cured through the remaining vinyl groups.

In a radiation cure the coated surface is exposed to sufficient radiation which may either be particulate or nonparticulate radiation in amounts sufficient and for a time necessary to cure the vinyl groups. Suitable sources of particulate and nonparticulate ionizing radiation include ultraviolet or radioactive sources such as are described in U.S. Pat. No. 3,935,330 issued Jan. 27, 1976 to Smith et al. herein incorporated by reference. To enhance the rate of radiation curing of vinyl group, free radical initiators may be included in the composition such as benzoin, benzoin ethers, Michler's Ketone and chlorinated polyaromatic hydrocarbons. Other free radical initiators ordinarily include organic peroxides, hydroperoxides, per acids, per esters, azo compounds, ditertiary butyl peroxide, cumene hydroperoxide, benzoyl peroxide, 2,4-dichlorobenzoyl peroxide, tertiary butyl hydroperoxide, 2,5-dimethyl-2,5-bis(hydroperoxy)-hexane, peracetic acid, tertiary butyl perbenzoate, tertiary butyl peracetate, perbenzoic acid, tertiary butyl peroxypivalate, tertiary butyl peracetic acid and azobisisobutyl nitrile. Such free radical initiators are utilized in most cases at from about 0.01% to about 20% by weight of the radiation curable component. Accelerators to speed up the cure of the vinyl groups may also be included in similar amounts and such materials include N,N-dimethyl-p-toluidene, tri-normal butylamine, and benzhydrazine. It is also possible to include with the vinyl functional reaction product used for its film forming capabilities a material to inhibit free radical generation prior to the cure. Examples of such suitable inhibitors include hydroquinone and the methyl ether thereof, butylated hydroxy toluene, tri-hydroxybenzene and nitrogen free radical at a level of from about 5 ppm to about 2000 ppm by weight of the radiation curable components.

The amount of radiation necessary to cure the reactive material will, of course, depend on the angle of exposure to the radiation, the thickness of the coating to be applied, and the amount of reactive material in the coating composition as well as the presence or absence of a free radical initiating catalyst. For any given composition experimentation to determine the amount of vinyl bonds not cured following exposure to the radiation source is the best method of determining the amount and duration of the radiation required.

If desired rather than using radiation curing the vinyl functional reaction product may be finally cured without radiation provided that sufficient free radicals are generated via a suitable catalyst such as t-butylperbenzoate or di-t-butylperoxide or other catalysts as previously described. This is often accomplished along with mild heating of the film to obtain the fully cured coating without the use of radiation.

Additional components which may be included with the vinyl functional reaction product include pigments, dyes, reflective materials and so forth. In fact, it has been found that the pigment is effectively transferred to the piece by the action of the substituted ammonium salt in the bath and that such is a distinct advantage over known cathodic deposition products.

The following are examples of the present invention.

EXAMPLE I

The fatty amido amine is prepared through the reaction of 103 grams (1 mole) of diethylene triamine and 282 grams (1 mole) of oleic acid. The reactants are stirred and heated at 180–185 degrees C. until the reaction is 95% complete as indicated by the corresponding elimination of water through the reaction. A light vacuum is applied while cooling to remove small quantities of volatile materials primarily water and amines from the reaction mass. In the next step 36.5 grams of this product which approximates 0.1 mole is dissolved in 10 grams of the monoethyl ether of ethylene glycol and 5.8 grams (0.1 mole) of propylene oxide is added to remove substantially all of the primary amine structure remaining in the amido amine. The mixture is warmed slightly to reflux and then held just below 65 degrees C. while adding 0.6 grams of monomethyl ether of hydroquinone and 59.2 grams (0.2 mole) of trimethylol propane triacrylate. The purpose of the hydroquinone compound is to stabilize the acrylate groups so that they do not begin to cross polymerize through the vinyl structure. The temperature during this step of the reaction is held at from about 60–65 degrees C. for two hours. At that point 5 grams of Trigonal 14, a photosensitizor consisting of a mixture of alkyl ethers of benzoin, is added along with 12.0 grams of glacial acetic acid and 1000 milliliters of deionized water. The glacial acetic acid thereupon forms the substituted ammonium salt of the vinyl functional compound at a pH of approximately 5.6.

EXAMPLE II

An amido amine is prepared as in Example I from 104 grams (1 mole) of N-hydroxyethyl-ethylenediamine and 282 grams (1 mole) of oleic acid. Then 147.2 grams of product (0.4 mole) are dissolved in 40 grams of monoethyl ether of ethylene glycol and to the solution is added 1.2 grams of methylether of hydroquinone as previously indicated to prevent initiation. 118.4 grams (0.2 mole) of trimethylol propane triacrylate is added to react with the secondary amine groups in the amido amine. 14.4 grams of the Trigonal 14 are again employed as a photosensitizor as in Example I. Thereafter the amido amine which has been reacted through its secondary amine structure with the vinyl compound (trimethylol propane triacrylate) is reacted with 24 grams (0.4 mole) with a glacial acetic acid and 1000 milliliters of water is added to give a cationic dispersion having a pH of approximately 5.9.

EXAMPLE III

A solution of 36.5 grams (0.1 mole) of the amido amine of Example I in 10 grams of monoethyl ether of ethylene glycol is prepared. Next 8.6 grams of methyl acrylate is added to remove any remaining primary amine structure.

The foregoing mixtures are then stirred and heated at 60 degrees C. for one hour. Thereafter, 59.2 grams (0.2 mole) of trimethylol propane triacrylate is added and the temperature maintained at 60–65 degrees C. for two more hours. Finally, after adding 5 grams of the Trigonal 14 and 12 grams (0.2 mole) of glacial acetic acid is added to form a cationic dispersion when combined with 800 milliliters of deionized water. The pH of the cationic dispersion is 5.7.

EXAMPLE IV

Each of the cationic dispersions in Examples I, II, and III are applied to steel panels using an electrodeposition cell made by Ransberg and identified as a Ransplater Model 600 AA. This device has been modified to function as a cathodic electrodeposition cell by reversing its polarity. Coatings are deposited by applying the direct current as indicted so that steel panels are immersed in the dispersions and are functioning as the cathode. The coatings are air dried for a short time and then cured or polymerized by passing the steel panel under an ultraviolet light in a Sun Graphic ultraviolet machine, Model QC 1201 using 10 passes at 50 feet per minute.

The test data for Examples I through III are as indicated in Table I set out below.

| Coating of Ex. # | Electrocoating Voltage | Electrocoating Time | Film Thickness | Pencil Hardness |
|---|---|---|---|---|
| I | 100 | 60 sec. | 2 mils | B-HB |
| II | 100 | 90 sec. | 1.5 mils | B-HB |
| III | 100 | 60 sec. | 0.8 mils | 3B |

All the films were found to be resistant by overnight immersion in water. All of the test panels withstood 50 rubs with methyl isobutyl ketone with no evidence of marring of the cured coating.

In the above table the electrocoating voltages are given in DC voltage and abbreviation "mils" stands for thousandths of an inch thickness of the coating. The pencil hardness is a standard designation of the hardness of the pencil used at normal pressure in an attempt to scratch the coating. The results indicate that the foregoing coatings are both flexible and highly water resistant. Substantially similar results may be obtained when utilizing fatty acids to form the amido amine having 8, 10, 12, 14 or 16 carbon atoms as well as 20 carbon atoms. In place of the acetic acid in the foregoing examples, lactic acid may be conveniently employed as the neutralizing agent.

What is claimed is:

1. A vinyl functional compound comprising the reaction product of:
   (a) an amido amine which is the product of reacting a fatty acid having from about 8 to about 22 carbon atoms with an amine containing from about 2 to about 10 carbon atoms and which contains at least 3 available amine hydrogens wherein at least 1 secondary amine hydrogen remains after the amide formation;
   (b) a sufficient amount of a member selected from the group consisting of acrylic acid esters, methacrylic acid esters, ethylene oxide, propylene oxide and mixtures thereof to react with any remaining primary amine hydrogens, and;
   (c) a vinylic material having at least 2 vinyl reactive groups in an amount sufficient to substantially react with the remaining secondary amine hydrogens,
to give the vinyl functional compound.

2. The vinyl functional compound of claim 1 wherein the amine contains from about 2 to about 6 carbon atoms.

3. The vinyl functional compound of claim 1 wherein the amine is selected from the group consisting of diethylene triamine, N-hydroxyethyl-ethylenediamine and mixtures thereof.

4. The vinyl functional compound of claim 1 wherein component (b) is propylene oxide.

5. The vinyl functional compound of claim 1 wherein component (b) is a $C_1$-$C_4$ ester of acrylic acid.

6. The vinyl functional compound of claim 1 wherein the fatty acid is oleic acid.

7. The vinyl functional compound of claim 1 wherein component (c) is trimethylolpropane triacrylate.

8. The vinyl functional compound of claim 1 wherein the carbon chain length of the fatty acid is from about 12 to about 18 carbon atoms.

9. The vinyl functional compound of claim 1 which is converted to the corresponding substituted ammonium salt through the use of lactic and acetic acid and mixtures thereof.

* * * * *